(12) United States Patent
Rajkhowa et al.

(10) Patent No.: US 12,361,477 B2
(45) Date of Patent: Jul. 15, 2025

(54) THIRD PARTY CARRIER MANAGEMENT

(71) Applicant: Walmart Apollo, LLC, Bentonville, AR (US)

(72) Inventors: Pratosh Deepak Rajkhowa, Sunnyvale, CA (US); Shanmuga Sundaram, Madurai (IN); Nitin Agrawal, Karnataka (IN); Vikram Bhogayta, Karnataka (IN); Rohit Jain, Sunnyvale, CA (US); Deepak Deshpande, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 195 days.

(21) Appl. No.: 16/392,068

(22) Filed: Apr. 23, 2019

(65) Prior Publication Data
US 2020/0342525 A1    Oct. 29, 2020

(51) Int. Cl.
*G06Q 30/08*    (2012.01)
*G06F 9/54*    (2006.01)

(52) U.S. Cl.
CPC .............. *G06Q 30/08* (2013.01); *G06F 9/54* (2013.01)

(58) Field of Classification Search
CPC ...... G06Q 30/08; G06Q 10/083; G06Q 10/08; G06Q 10/0833; G06Q 10/08345; G06Q 10/0835; G06Q 10/0834; G06Q 10/08355; G06Q 10/0832; G06Q 50/30; G06Q 10/087; G06Q 30/0611; G06F 9/54
See application file for complete search history.

(56) References Cited

U.S. PATENT DOCUMENTS

| | | | | |
|---|---|---|---|---|
| 5,845,283 A * | 12/1998 | Williams | ............... | G06F 16/258 |
| 6,463,420 B1 * | 10/2002 | Guidice | ................ | G06Q 10/08 |
| | | | | 705/28 |
| 10,482,415 B1 * | 11/2019 | Dotterweich | ...... | G06Q 10/0833 |
| 2002/0082970 A1 * | 6/2002 | Ciroli, Jr. | ............... | G06Q 40/04 |
| | | | | 705/37 |

(Continued)

OTHER PUBLICATIONS

"Logistics.Com Launches Self-Service Transportation Procurement Tool." PR Newswire, Dec. 10, 2001, p. 1. ProQuest. Web. Mar. 12, 2025 https://dialog.proquest.com/professional/docview/447807608?accountid=131444 (Year: 2001).*

*Primary Examiner* — Michael P Harrington
(74) *Attorney, Agent, or Firm* — Morgan, Lewis & Bockius LLP; Manita Rawat

(57) ABSTRACT

This application relates generally to third party carrier management by a shipper of items. These items may be ordered and shipped by the shipper to a distribution center with final delivery performed by the third party carrier. In an embodiment, a system includes at least one processor operatively coupled with a datastore, the at least one processor configured to: send a bid inquiry to a first carrier device and a second carrier device; receive first bid information responsive to the bid inquiry from the first carrier device; receive second bid information responsive to the bid inquiry from the second carrier device; determine a common delivery condition set of the first bid information and the second bid information; and select the first carrier device over the second carrier device based on the common delivery condition set of the first bid information and the second bid information.

19 Claims, 8 Drawing Sheets

(56) References Cited

U.S. PATENT DOCUMENTS

| | | | | |
|---|---|---|---|---|
| 2002/0095308 A1* | 7/2002 | Pragelas | G06Q 10/08 |
| | | | 705/75 |
| 2003/0216993 A1* | 11/2003 | Goldwerger | G06Q 10/08 |
| | | | 705/37 |
| 2005/0060165 A1* | 3/2005 | Knight | G06Q 20/203 |
| | | | 705/22 |
| 2006/0192673 A1* | 8/2006 | Irwin | G06Q 10/08 |
| | | | 340/539.13 |
| 2006/0229895 A1* | 10/2006 | Kodger | G06Q 10/08 |
| | | | 705/333 |
| 2007/0208768 A1* | 9/2007 | Laik | G06F 16/25 |
| 2008/0320044 A1* | 12/2008 | Cesarini | G06Q 10/10 |
| 2016/0042317 A1* | 2/2016 | Goodman | G06Q 10/0838 |
| | | | 705/333 |
| 2016/0224935 A1* | 8/2016 | Burnett | G06Q 10/0834 |
| 2016/0335593 A1* | 11/2016 | Clarke | G06Q 10/0833 |
| 2017/0154302 A1* | 6/2017 | Streebin | G06T 7/521 |
| 2017/0154347 A1* | 6/2017 | Bateman | G06Q 40/08 |
| 2017/0270468 A1* | 9/2017 | Natarajan | G06Q 30/08 |
| 2018/0025417 A1* | 1/2018 | Brathwaite | G06Q 10/0835 |
| | | | 705/14.66 |
| 2018/0096414 A1* | 4/2018 | Iacono | G06Q 30/0637 |
| 2018/0165642 A1* | 6/2018 | Krieg | G06Q 50/28 |
| 2018/0330324 A1* | 11/2018 | McCandless | G06Q 10/06315 |
| 2019/0066041 A1* | 2/2019 | Hance | G06Q 10/083 |
| 2019/0266690 A1* | 8/2019 | Mandeno | G06Q 10/06 |

\* cited by examiner

THIRD PARTY CARRIER MANAGEMENT

TECHNICAL FIELD

This application relates generally to third party carrier management by a shipper of items. These items may be ordered and shipped by the shipper to a distribution center with final delivery performed by the third party carrier.

BACKGROUND

One or more items may be ordered as an item order from a customer. This item order may be, for example, one or more items (e.g., discrete, deliverable products such as groceries, food, toiletries, clothing, and/or other personal property) ordered by a customer (e.g., user) from a shipper (e.g., a merchant or other entity charged with facilitating delivery of the item to the customer). This item order may be, for example, an item order over the phone or off of an electronic commerce (e.g., e-commerce) website maintained by the shipper. The constituent items may be cross referenced with the shipper's inventory at a distribution center and/or ordered by the shipper to be available at the distribution center for final delivery the customer. Traditionally, the shipper would personally perform final delivery of the ordered items to the customer. This final delivery may differ from bulk delivery of items to the distribution center as the final delivery may only be the delivery of the items in an item order to a customer. However, doing so would require significant overhead in resources (e.g., a fleet of the shipper's own delivery vehicles to make individual final deliveries) and may take away valuable resources from managing other concerns of the shipper (e.g., managing item orders and inventory shipped into the shipper's distribution center). Accordingly, traditional techniques for final delivery may not be entirely satisfactory.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In an embodiment, a system includes at least one processor operatively coupled with a datastore, the at least one processor configured to: send a bid inquiry to a first carrier device and a second carrier device, wherein the bid inquiry characterizes an item for delivery; receive first bid information responsive to the bid inquiry from the first carrier device; receive second bid information responsive to the bid inquiry from the second carrier device; determine a common delivery condition set of the first bid information and the second bid information; and select the first carrier device over the second carrier device based on the common delivery condition set of the first bid information and the second bid information.

In an embodiment, a method includes: sending a bid inquiry to a first carrier device and a second carrier device, wherein the bid inquiry characterizes an item for delivery; receiving first bid information responsive to the bid inquiry from the first carrier device; receiving second bid information responsive to the bid inquiry from the second carrier device; determining a common delivery condition set of the first bid information and the second bid information; and selecting the first carrier device over the second carrier device based on the common delivery condition set of the first bid information and the second bid information.

In an embodiment, a non-transitory computer readable medium having instructions stored thereon, wherein the instructions, when executed by a processor, cause a device to perform operations comprising: sending a bid inquiry to a first carrier device and a second carrier device, wherein the bid inquiry characterizes an item for delivery; receiving first bid information responsive to the bid inquiry from the first carrier device; receiving second bid information responsive to the bid inquiry from the second carrier device; determining a common delivery condition set of the first bid information and the second bid information; and selecting the first carrier device over the second carrier device based on the common delivery condition set of the first bid information and the second bid information.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
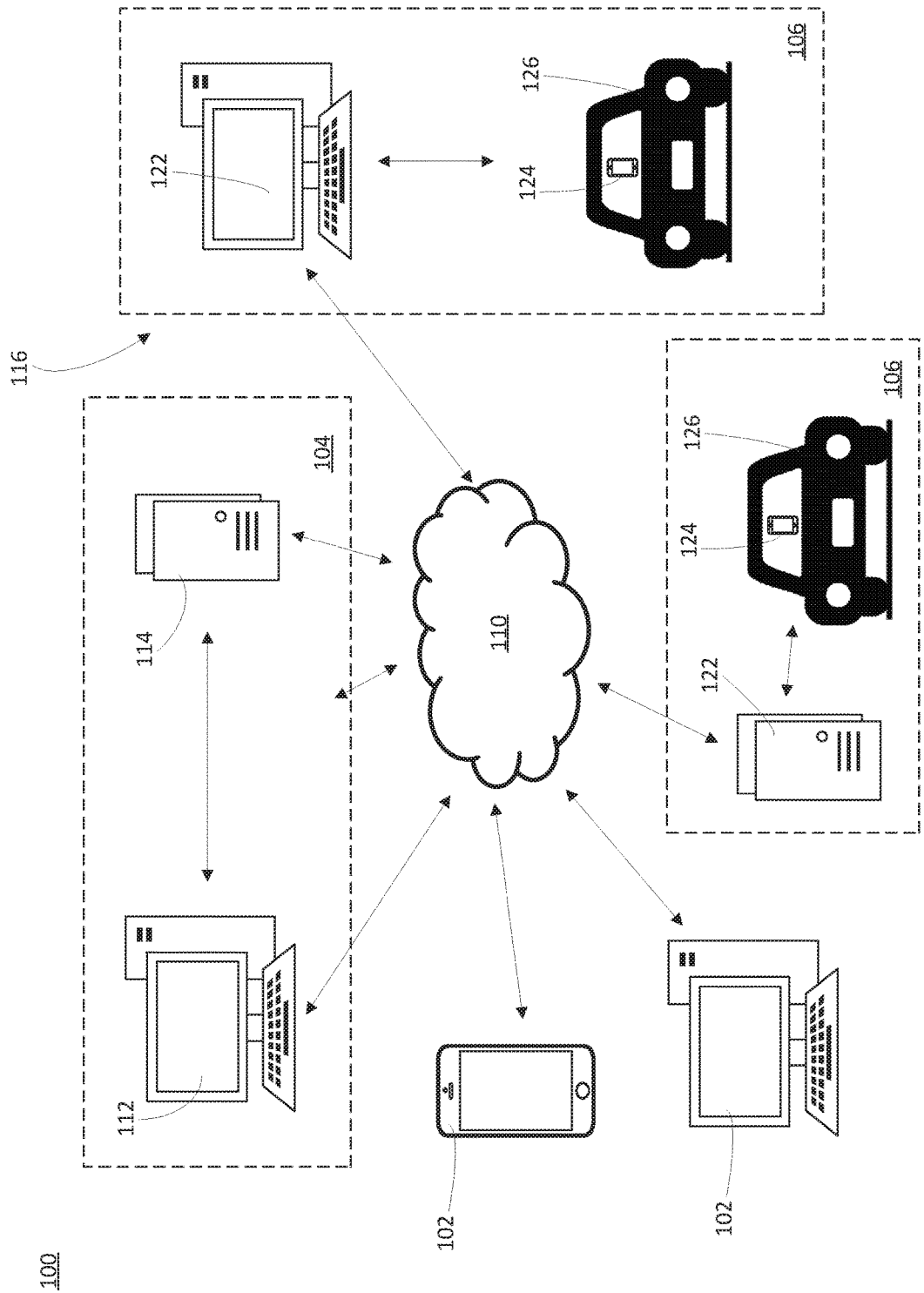
FIG. 1 is a system diagram illustrating features of a final delivery management system, in accordance with certain embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

A new approach is proposed that contemplates systems and methods for final delivery management of third party carriers by a shipper of items. As introduced above, final delivery, also referred to as "last mile" delivery, may be delivery of an item from a distribution center (e.g., a pickup location) to a particular customer (e.g., to a customer location). This final delivery may differ from bulk delivery or provision of items to a distribution center (e.g., a brick and mortar store, storage facility or warehouse for items) of the shipper. For example, the items at the distribution center, or items shipped to the distribution center, may not be necessary in the form of an assembled item order as the items at the distribution center may be organized for eventual assembly into an item order at the distribution center. Also, the distribution center is typically not a customer location (e.g., a customer delivery address or location for item order delivery) for end delivery of the item order. Thus, final delivery of an item order may be performed from the distribution center to the customer location to fulfill the item order. As noted above, this final delivery may be resource intensive as each item order may be different from another item order and be individually delivered to a respective customer location that may be different from other customer locations in other item orders.

Accordingly, a shipper may manage final delivery by utilizing third party carriers to perform final delivery. This may free the shipper from the resource intensive task of final delivery so that the shipper may focus more on maintaining and ordering the bulk item inventory at the distribution center to fulfil individual item orders. Furthermore, there has been a proliferation of different third party carriers. Examples of third party carriers may include the Uber Eats division of Uber Technologies, Inc. headquartered in San Francisco, California for takeout food delivery; Instacart headquartered in San Francisco, California for groceries delivery; and Postmates Inc. headquartered in San Francisco, California for consumer items delivery. Each of these different third party carriers may have their own interaction requirements (e.g., application programming interface, electric portal, or other manner of entrustment for item order delivery). Accordingly, this final delivery management may take into account the different interaction requirements of various third party carriers so as to interact with all of the various third party carriers in a seamless and uniform platform opaque to an end user or customer that utilizes the final delivery management system.

In various embodiments, a final delivery management system may include a shipper platform including at least one shipper device (e.g., at least one computing device configured to implement the actions of a shipper), a customer device (e.g., at least one computing device configured to implement the actions of a customer), and a carrier platform including at least one carrier device (e.g., at least one computing device configured to implement the actions of a carrier). As will be discussed further below, each of these devices may be implemented as, for example, a desktop computer, a tablet computer, a smart phone, a server, or any other type of computing device. As introduced above, the shipper device may be part of a shipper platform which may also include a fulfillment server that the shipper device may interact with. Thus, the shipper device may represent the component of the shipper platform at a particular distribution center. Also, the carrier device may be part of a carrier platform that may also include individual courier devices that may more directly perform the physical actions of delivering an item order in final delivery from the distribution center to the customer location. For example, carrier device may represent a computing device of a dispatcher or centralized server and the courier device may be a smart phone or mobile computing device carried by a person navigating a vehicle used to carry an item order from a distribution center to a customer location. As another example, the courier device may be the same as the carrier device, such as where a courier device is part of a fleet of autonomous vehicles configured to perform delivery by the carrier in an automated manner.

In particular embodiments, a shipper platform (e.g., a shipper device of the shipper platform) may interact with at least two carrier platforms (e.g., respective carrier devices of the carrier platforms). For example, the shipper platform may send a bid inquiry to the at least two carrier platforms. As noted above, each of the at least two carrier platforms may be associated with different interaction requirements. For example, a first carrier platform of the at least two carrier platforms may utilize a particular application programming interface (API) configured process data in a particular data structure or format. Similarly, a second carrier platform of the at least two carrier platforms may utilize a different API configured to process data formatted in a different data structure or format as compared with the first carrier platform.

Accordingly, a carrier platform interface may facilitate communications between the different carrier platforms and the common bid inquiry or other communications from the single shipper platform to the different carrier platforms. This carrier platform interface may include a library of each respective API, as associated with each carrier platform, for use in interactions with each carrier platform.

In certain embodiments, a bid inquiry may include data sufficient for each carrier platform to provide a bid response to the bid inquiry. For example, the bid inquiry may include bid inquiry data such as a distribution center location (e.g., a pickup location or address), a customer location, a pick up time, and an item order composition (e.g., a weight, identifier, quantity, or other characteristic of each item within the item order for delivery).

In certain embodiments, a customer item order set may represent the full extent of a customer's order in a single transaction while the item order may represent a single shipment transaction of the customer item order set. Thus, in certain embodiments, an item order may represent only a part of (e.g., not the entirety of) a customer item order set put in by a customer with the shipper platform. In other embodiments, the item order may be the entire customer item order set. Stated another way, the customer item order set may differ from an item order for delivery, such as when the customer item order set is broken up into different item orders for final delivery (e.g., based on batch availability of the items that may constitute the item order but not constitute the customer item order set).

In certain embodiments, the shipper platform may receive respective bid responses from the respective carrier platforms. Each of these bid responses may include bid response information that characterizes how each shipper platform proposes to perform the delivery of the item order. For example, the bid response information may include a price, a pickup time, a quality of service, an estimated time of arrive, and a carrier personnel identifier. Each of these bid responses may be processed by the carrier platform interface so that the bid response information in the format of each respective carrier platform may be arranged in a common data structure or otherwise expressed as common delivery conditions. Stated another way, the common delivery conditions may represent the common types of information in each bid response information (e.g., price, pickup time, and the like) in which a selection of a carrier platform may be based on. Then, the shipper platform may make a selection of the carrier platform based on the common delivery conditions in each set of bid information from each respective carrier platform (e.g., the price, pickup time, and the like of each respective carrier platform). In certain embodiments, all of the information in each of the bid responses may be present in the common delivery conditions. However, in other embodiments, only some of the information in particular bid responses may be present in the common delivery conditions. For example, some of the bid responses may include information that is not in other bid responses and/or not necessary for use in the selection of a carrier platform (e.g., information specific to a particular shipper platform or a particular delivery condition that is not utilized for carrier platform selection). These common delivery conditions may be processed by the shipper platform to select one of the several carrier platforms to perform final delivery of the item order from the distribution center to the customer location. For example, this processing may be based on at least one of price, a pickup time, a quality of service, an estimated time of arrive, and a carrier personnel identifier. As a more specific example, in certain embodiments, the shipper platform may select a carrier platform that is the cheapest (e.g., lowest price from the common delivery conditions), the cheapest with the highest quality of service, or any other combination of criteria from the common delivery conditions. The quality of service may refer to classifications of service quality to be provided upon delivery (e.g., where a higher quality of services may refer to greater amenities such as faster vehicles, vehicles with greater amenities such as refrigerated holds, and the like.)

In various embodiments, the carrier platform interface may facilitate communications and translate between the different carrier platforms (e.g., their respective carrier platform information) and the shipper platform (e.g., the shipper platform information). For example, the carrier platform interface may send shipper platform information meant for a particular carrier platform via an application programming interface (API) of that particular carrier platform so that the transmitted shipper platform information may be properly received and processed by that particular carrier platform. Similarly, the carrier platform interface may receive carrier platform information for transmission to the shipper platform via the same API of that particular carrier platform so that the transmitted carrier platform information may be properly received and processed by the shipper platform. This API may be different for each carrier platform. In addition, the carrier platform interface may also process received and/or transmitted information, such as via filling in the information to respective parameter fields of a respective data structure used in a carrier platform or a shipper platform.

In various embodiments, the selection of a particular carrier platform may trigger the transmission of a carrier entrustment message from the shipper platform to the selected carrier platform. The carrier entrustment message may be utilized to indicate that the selected carrier platform has been selected to carry out the item order delivery based on the selected carrier platform's bid response. In certain embodiments, the selected carrier platform may also send a carrier acceptance message from the selected carrier platform to the shipper platform in response to the receipt of the carrier entrustment message (e.g., to acknowledge receipt of the carrier entrustment message). In various embodiments, the carrier acceptance message may include further details on how the item is to be delivered to the courier, such as a license plate number or other details of a specific courier that were omitted in the bid response for brevity. For example, the bid response may include bid response information that may be utilized by the shipper platform to make a selection of a carrier platform. However, there may be more details that would not be necessary for carrier selection but may be useful for the shipper platform to coordinate the final delivery. As noted above, the carrier platform may include a carrier device that coordinates among respective couriers of the carrier platform. Accordingly, in certain embodiments, the carrier platform may only assign a courier to a particular item order only once carrier entrustment message is received. Thus, the specific information (e.g., carrier delivery details) concerning the assigned courier may then be sent over in the carrier acceptance message.

In certain embodiments, the carrier platform may provide current information on the status of a courier. For example, the carrier platform may send a carrier pickup notification that characterizes an estimated time of arrival for a courier to pick up the item from a distribution center (e.g., a pickup location). In various embodiments, the pickup location may be the distribution center. However, in other embodiments, a pickup location may simply be anywhere the constituent items in the item order may be picked up and not necessarily a formal distribution center in which bulk items other than the constituent items of the item order are being stored. In response, the shipper platform may produce a carrier loading instruction to ready the item(s) for pick up by the courier at the distribution center (e.g., pickup location) by the estimated time of arrival. This carrier loading instruction may, for example, instruct personnel at the distribution center (e.g., pickup location) to prepare the items of the item order for pick up by the courier of the carrier platform. In certain embodiments, the carrier loading instruction may instruct the distribution center to move the item order from a warehouse to a storefront of the distribution center. The warehouse may be a back office storage location where items are stored or organized for long term storage. The warehouse may be where items are stored upon delivery to the distribution center. The storefront may be a front office where items may be temporarily stored for quick retrieval. The manner of item storage at the warehouse may be different than at the storefront, such as where item storage at the warehouse may be indexed based on the type of item while item storage at the storefront may be based on item order, where multiple item orders may be assembled from items at the warehouse and brought to the storefront for storage. In various embodiments, movement of the item order at the distribution center may be performed in a manual manner (e.g., as moved by distribution center personnel). In particular embodiments, movement of the item order at the distribution center may be made via automated equipment (e.g., via a system of robotic arms, automated guided vehicles, and/or conveyor belts).

In certain embodiments, a single courier and/or carrier platform may (e.g., for efficiency's sake) deliver multiple item orders. Thus, the single courier may also load up multiple item orders at the distribution center (e.g., pickup location) for delivery in series with each respective item order to each customer location.

In further embodiments, delivery status information may be sent from the carrier platform to the shipper platform. This delivery status information may characterize the status of the delivery being performed by the courier. For example, the delivery status information may include a courier location and an estimated time of arrival to a customer location. In various embodiments, this delivery status information may be provided as a push or as a pull. When provided as a push, the carrier platform may periodically provide the delivery status information to the shipper platform. When provided as a pull, the shipper platform may send a delivery status request to the carrier platform and the carrier platform may respond with the delivery status information. When provided as a pull, also, the shipper platform may periodically send the delivery status request to the carrier platform. In various embodiments, the shipper platform may also provide the delivery status information to a customer (e.g., to a customer device). For example, the shipper platform may provide the same delivery status information received from the carrier platform to the customer device (e.g., via an electronic portal or a push notification to the customer device). In further embodiments, the shipper platform may provide selective delivery status information to the customer device that may not include all of the delivery status information received from the carrier platform (e.g., a paired down version of the delivery status information). For example, the delivery status information may include a current location and speed of the courier but the selective delivery status information may only include the estimated time of arrival of the courier to the customer location.

In various embodiments, a customer device may actively indicate acceptance or rejection of the item order during final delivery. As noted above, this final delivery may refer to a time after the item order is ready at the distribution center and/or after the shipper device sends a bid inquiry or shipper delivery notification indicating to the customer device that the item order is ready for final delivery from the distribution center. This active acceptance may be made via an acceptance message sent to either the shipper platform or the carrier platform. If sent to the carrier platform, the carrier platform may then inform the shipper platform of the acceptance message. Also, the shipper platform may update the records at the shipper platform, such as to note that the item order has been fulfilled (e.g., that the customer device may have accepted the item order). In other embodiments, an active acceptance message may not be necessary, but a carrier platform may indicate that the item order has been fulfilled by delivery to the carrier location (e.g., to a particular address or mail box). Then, the shipper platform may update the records at the shipper platform, such as to note that the item order has been fulfilled (e.g., that the customer device may have accepted the item order).

In other embodiments, the customer device may indicate rejection of the item order during final delivery. This rejection of the item order may also be referred to as order cancellation. This rejection (e.g., cancellation) of the item order may be based on, for example, receipt of the item order in a damaged state or tardiness of final delivery (e.g., where the courier took too long to deliver an item order, such as an item order of perishable items such as hot or cold food). This rejection made via a rejection message sent to either the shipper platform or the carrier platform. If sent to the carrier platform, the carrier platform may then inform the shipper platform of the rejection message. Also, the shipper platform may update the records at the shipper platform, such as to note that the item order has been not been fulfilled (e.g., that the customer device may indicated a rejection of the item order.) In certain embodiments, a return of the item order during final delivery may also fall under a rejection of the item order. In further embodiments, when the item order is rejected, the carrier platform may also send a return notification to indicate that the rejected items of the item order are to be returned to the distribution center. This return notification information may include, for example, a location of the courier or estimated time of arrival of the courier during the return to the distribution center for return of the items.

In certain embodiments, a projected arrival time (e.g., estimated time of arrival) for the courier may be determined by the shipper platform. This projected arrival time may be calculated in response to receiving the initiation time (e.g., time in which the projection is started) and initiation location (e.g., location at which the projection is started) or may be calculated at certain intervals or continuously using live information (e.g., global positioning system (GPS) based location information) concerning the location of the courier as it is traveling to the distribution center (e.g., the pickup location) or to the customer location. This arrival time may be calculated in accordance with conventional automotive navigation techniques in which the initiation location and/or live location information from the user device is used for position data. This position data is then correlated to geospatial data (e.g., streets in a map database) to determine a route to the distribution center (e.g., the destination). This route may be determined via, for example, a solution to the shortest path problem in graph theory. Accordingly, a projected time to the distribution center or customer location may be calculated in a conventional manner based on projected vehicle speeds, and/or other information such as traffic patterns available via a traffic information server to obtain travel time for different street segments of the route.

FIG. 1 is a system diagram 100 illustrating features of a final delivery management system, in accordance with certain embodiments. At least one customer device 102, a shipper platform 104, and at least one carrier platform 106 may be interconnected over a network 110, such as the Internet. The customer device 102 may be any type of computing device capable of user interaction (e.g., via a user interface) and a network connection. For example, the customer device 102 may be a tablet computer, a smartphone, a desktop computer, and the like. The shipper platform 104 may include a shipper device 112 (e.g., a computing device located at a distribution center), at least one fulfillment server 114 (which may include at least one shipper data store). The carrier platform 106 may represent an individual network of devices associated with a particular carrier. For example, each carrier platform 106 may include a carrier device 122 and a courier device 124. This carrier device 122 may represent a network connected computing device configured to interact with either the customer device 102 or the shipper platform 104 over the network 110. For example, the carrier device 122 may represent a computing device with a user interface (e.g., a desktop computer, a tablet computer, or any other type of computing device with a user interface) for user input from an agent of the carrier platform, or a computing device configured to perform automated process such as a server. In addition, the carrier device 122 may be configured to directly communicate with and/or control at least one courier device 124. The courier device 124 may be a computing device more closely located with a courier 126 than the carrier device 122. For example, the courier 126 may represent a vehicle and/or other manner of locomotion or transportation. The courier 126 may be automated (e.g., a self-driving vehicle) or driven by an agent of the carrier platform (e.g., a human driver). The courier device 124 may represent a computing device at the courier such that geospatial information and/or other feedback from the location of the courier 126 may be communicated to the carrier device 122. In certain embodiments, the carrier device 122 and the courier device 124 may be the same device and thus operations attributable to one may be attributable to the other. Also, in further embodiments, the courier device 124 may be integrated with the courier 126 itself, such as with a self-driving vehicle, such that there is no physical distinction between the courier device 124 and the courier 126. Stated another way, the courier 126 itself may represent the courier device 124, such as where the vehicle includes (e.g., may function as) a network connected computing device configured to communicate over the network 110. In various embodiments, the courier device 124 may be configured to be transported within a courier 126 (e.g., an automobile) and be utilize as a location sensor for the courier 126 as the courier 126 is traveling from one location to another (e.g., from a distribution center to a customer location).

Accordingly, each of the customer device 102, shipper device 112, fulfillment server 114, carrier device 122, and courier device 124 may constitute one or more individual computing devices. Each of these individual computing devices may also be configured for a networked connection (e.g., for communication, at least in part, over the network 110). In certain embodiments, the fulfillment server 114 may represent one or more servers configured to provide the functionality of the fulfillment server 114. In particular embodiments, the customer device 102 may constitute one more user devices associated with a customer or a customer account. In various embodiments, the shipper device 112 may consist one or more devices that may communicate with personnel or automated equipment at the distribution center. In certain embodiments, fulfillment server 114 may be directly coupled locally with a datastore. This datastore may include information, such as customer accounts or other information associated with one or more distribution centers, carrier platforms, and/or couriers.

Figure 2:
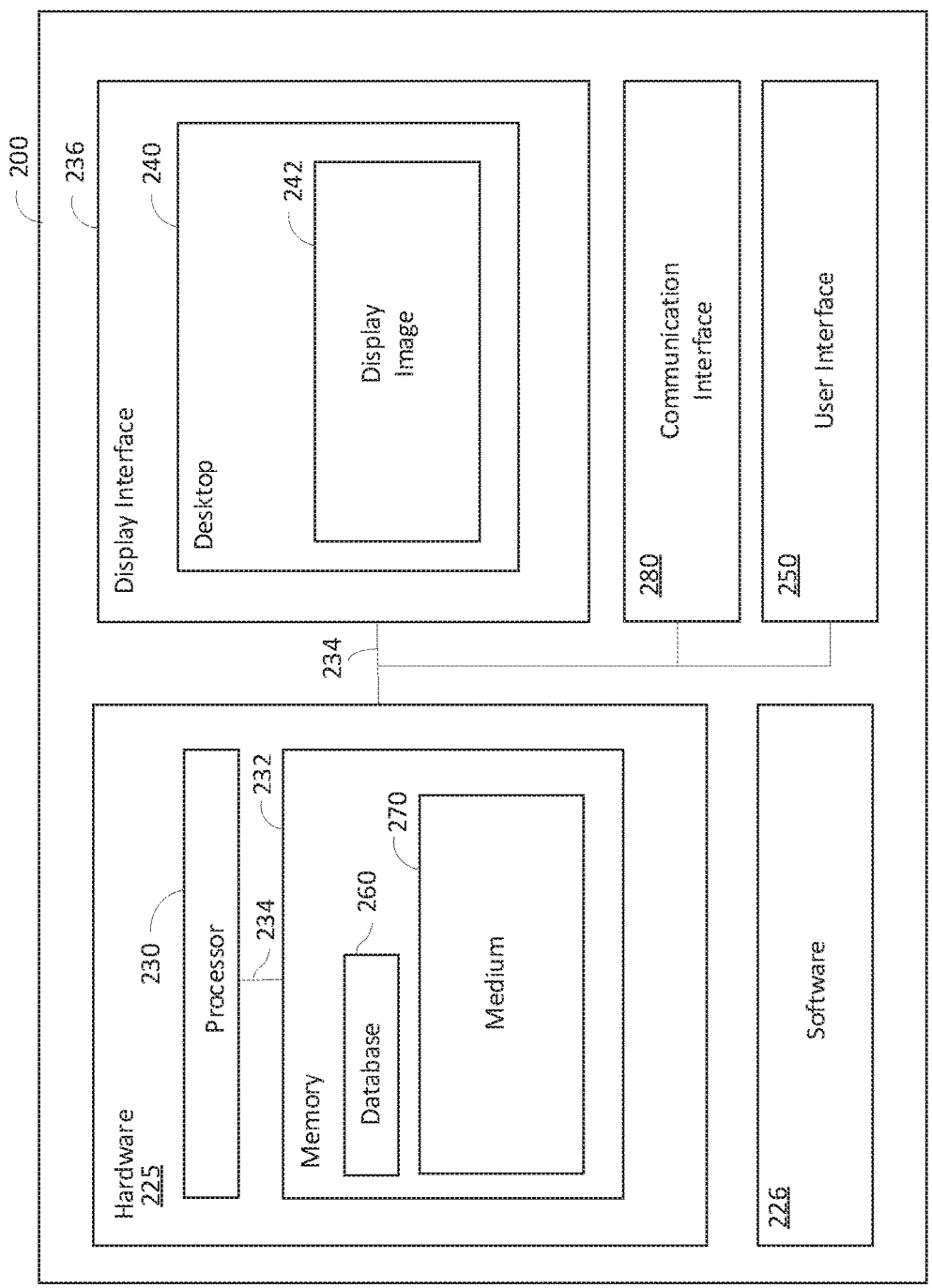
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular device (e.g., for a customer device, a shipper device, a carrier device, and/or a courier device) or server (e.g., a fulfillment server and/or a carrier device). In some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a number of GB of RAM. Memory 232 can also be a ROM, a network interface (NIC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from an operator of the computing device 200. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface.

In some embodiments, the computing device 200 can include a database 260 within memory 232, such that various information can be stored within database 260. Alternatively, in some embodiments, database 260 can be included within a remote datastore (not shown) or a remote server (not shown) with file sharing capabilities, such that database 260 can be accessed by computing device 200 and/or remote end operators. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be any device capable of running a software component. For non-limiting examples, the computing device 200 can be but is not limited to a server machine, smartphone, a laptop PC, a desktop PC, a tablet, a Google's Android device, an iPhone, an iPad, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, the Internet, an intranet, a wide area network (WAN), a local area network (LAN), a wireless network, Bluetooth, WiFi, and a mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

A network may be utilized as a vehicle of communication. In various aspects, the network may comprise local area networks (LAN) as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3A:
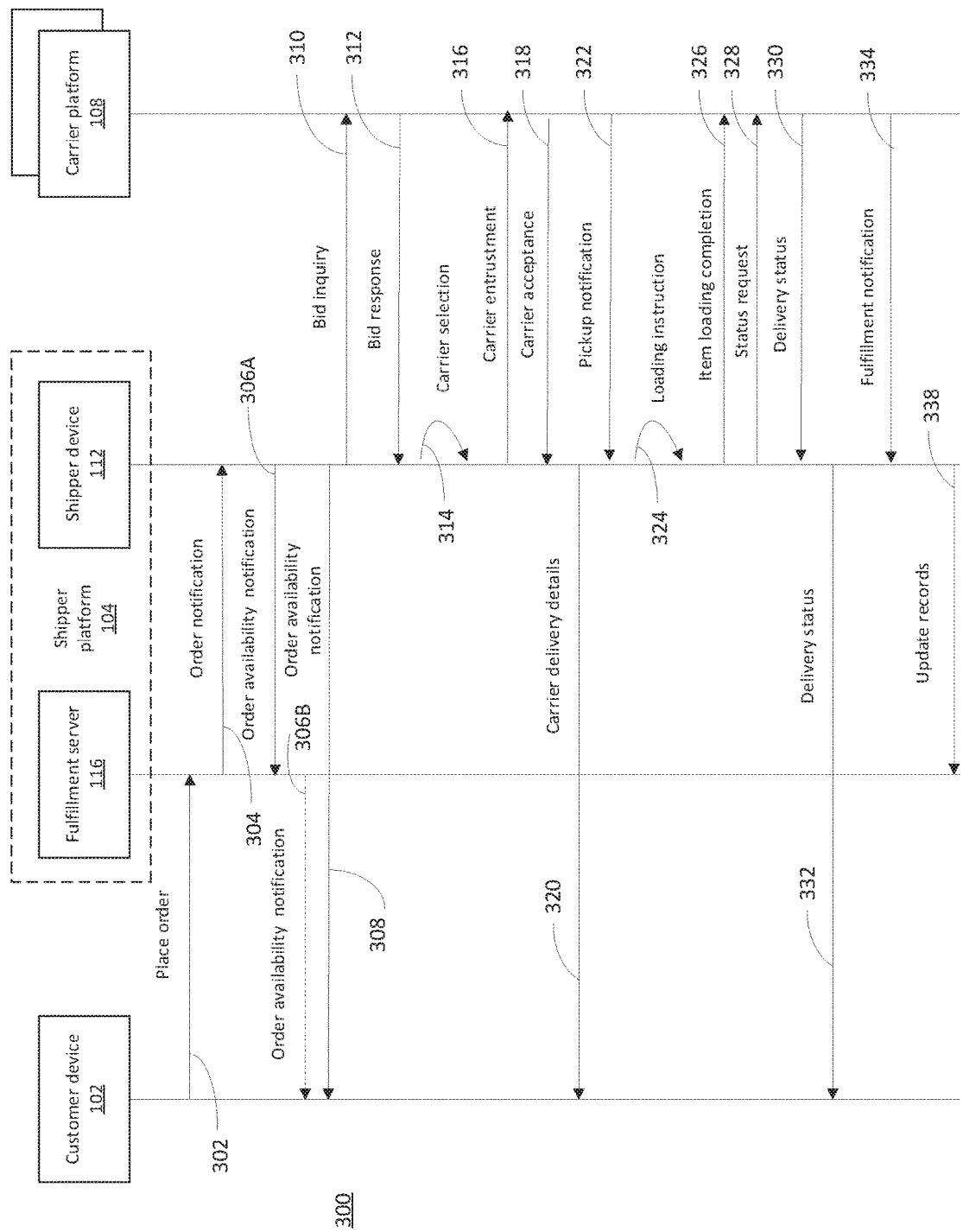
FIG. 3A is a diagram that illustrates final delivery management process, in accordance with some embodiments.

FIG. 3A is a diagram that illustrates final delivery management process 300, in accordance with some embodiments. The process 300 may be performed by the customer device 102, the shipper platform 104 and at least one carrier platform 108, interconnected over a network such as the Internet. As noted above, the shipper platform 104 may include a shipper device 112 and a fulfillment server 114. It is noted that the process 300 is merely an example, and is not intended to limit the present disclosure. Accordingly, it is understood that additional operations may be provided before, during, and after the process 300 of FIG. 3A, certain operations may be omitted, certain operations may be performed concurrently with other operations, and that some other operations may only be briefly described herein.

At operation 302, the customer device 102 may send an order message to the shipper platform 104 (e.g., a fulfillment server 114 of the shipper platform 104). The order message may identify, and include a request for, an item order. For example, the order message may be a message sent over an e-commerce system for an order (e.g., purchase) of particular items as an item order or as at least one item order.

In certain embodiments, the customer device 102 may provide a customer item order set that may be broken up into multiple item orders. This customer item order set may differ from an item order for delivery. For example, the customer item order set may be broken up into different item orders for final delivery (e.g., based on batch availability of the items that may constitute the item order but not constitute the customer item order set).

At operation 304, the fulfillment server 116 of the shipper platform 104 may communicate an order notification to the shipper device 112 of the shipper platform 104. The order notification may notify the shipper device 112 (e.g., computing device locally at a distribution center) to anticipate arrival of the items within the item order in a shipment. In further embodiments, the order notification may instruct the shipper device 112 to take an inventory and assemble the items of the item order at the distribution center.

At operation 306A, optionally, the shipper device 112 may send the fulfillment server 116 an order availability notification. Similarly, in conjunction or alternatively with operation 306A, at operation 308, the shipper device 112 may send the customer device 102 an order availability notification. The optional or alternative nature of operation 308 is illustrated by having operation 308 in outline. The order availability notification may notify the fulfillment server 116 and/or the customer device 102 that the item order is ready for final delivery. For example, the order availability notification may notify the fulfillment server 116 and/or customer device that an item order is ready at a particular distribution center for final delivery. For example, various items may be shipped periodically to various distribution centers such that an item order, previously unavailable, may finally match an inventory of the particular distribution center based on the periodic item deliveries. In other embodiments, items in the item order may be managed (e.g., shipped to the particular distribution center) using the fulfillment server such the shipper device 112 may be able to confirm availability of the items in the item order via the order availability notification.

In certain embodiments, at operation 306B, optionally, a fulfillment server may pass along an order availability notification to notify the customer device that the item order is available at the particular distribution center (e.g., the distribution center associated with the shipper device 112). Accordingly, the order availability notification of operation 306B may be sent as based on the receipt at the fulfillment server 114 of the order availability notification noted in operation 306A or may be based on other information (e.g., receipt of a predetermined shipment of the item order) confirming that the items within the item order are available at the particular distribution center associated with the shipper device 112.

At operation 310, the shipper platform 104 (e.g., the shipper device 112) may send a bid inquiry to at least two carrier platforms 108 (e.g., multiple carrier platforms 108). The bid inquiry may include data sufficient for each carrier platform to provide a bid response to the bid inquiry. For example, the bid inquiry may include bid inquiry data such as a distribution center location, a customer location, a pick up time, and an item order composition (e.g., a weight, identifier, quantity, or other characteristic of each item within the item order for delivery). Other examples of bid inquiry data may include, for example, a city, a type or indicator of items to be delivered (e.g., grocery, people, large objects), an order number, a source address/details (e.g., further details on the distribution center), destination details (e.g., further details on the customer location, such as nearest intersections or nearby landmarks), a minimum pick up time, a maximum pickup time, an expiration time (e.g., a time in which a bid response must be received to be considered), a minimum service guarantee request (e.g., a request that a certain percentage of bid responses be on time), a service window for pick up time, destination instructions (e.g., whether a signature is required for item order drop off, or other requirement for a proof of delivery), a request for driver details, and the like.

Each of the at least two carrier platforms may be associated with different interaction requirements. For example, a first carrier platform of the at least two carrier platforms may utilize a particular application programming interface configured to receive a bid inquiry formatted in a particular data structure or format. Similarly, a second carrier platform of the at least two carrier platforms may utilize a different application programming interface configured to receive the same bid inquiry formatted in a different data structure or format as compared with the first carrier platform. Accordingly, a carrier platform interface may facilitate communications between the different carrier platforms and the common bid inquiry or other communications from the single shipper platform to the different carrier platforms. Carrier platform interfaces will be discussed in further detail below in connection with FIG. 4.

At operation 312, the shipper platform 104 (e.g., the shipper device 112) may receive respective bid responses from the respective carrier platforms 108. Each of these bid responses may include bid response information that characterizes how each shipper platform proposes to perform the delivery of the item order. For example, the bid response information may include a price, a pickup time, a quality of service, an estimated time of arrive, and a carrier personnel identifier. In certain embodiments, each of the bid responses may provide information in response to the information provided in the bid inquiry. For example, the bid responses may include an acceptance or additional information concerning whether the carrier accepts delivery within the conditions provided by the bid inquiry, information characterizing a minimum pick up time, information characterizing a maximum pickup time, information characterizing a minimum service guarantee (e.g., a request that a certain percentage of bid responses be on time), information characterizing a service window for pick up time, and the like. Each of these bid responses may be processed by the carrier platform interface so that the bid response information in the format of each respective carrier platform may be arranged in a common data structure or otherwise expressed as common delivery conditions.

In certain embodiments, all of the information in each of the bid responses may be present in the common delivery conditions. However, in other embodiments, only some of the information in particular bid responses may be present in the common delivery conditions. For example, some of the bid responses may include information that is not in other bid responses and/or not necessary for use in the selection of a carrier platform (e.g., information specific to a particular shipper platform or a particular delivery condition that is not utilized for carrier platform selection).

At operation 314, the shipper platform 104 (e.g., the shipper device 112) may select a carrier for item order delivery. In certain embodiments, this selection may be based the common delivery conditions that may be processed by the shipper platform 104 (e.g., the shipper device 112) to select one of the several carrier platforms to perform final delivery of the item order from the distribution center to the customer location. As noted above, the common delivery conditions may represent the common types of information in each bid response information (e.g., price, pickup time, and the like) in which a selection of a carrier platform may be based on. Then, the shipper platform may make a selection of the carrier platform based on the common delivery conditions in each set of bid information from each respective carrier platform (e.g., the price, pickup time, and the like of each respective carrier platform). For example, this processing may be based on (e.g., as common delivery conditions) at least one of price, a pickup time, a quality of service, an estimated time of arrive, and a carrier personnel identifier. As a more specific example, in certain embodiments, the shipper platform may select a carrier platform that is the cheapest (e.g., lowest price from the common delivery conditions), the cheapest with the highest quality of service, or any other combination of criteria from the common delivery conditions. The quality of service may refer to classifications of service quality to be provided upon delivery (e.g., where a higher quality of services may refer to greater amenities such as faster vehicles, vehicles with greater amenities such as refrigerated or heated holds, and the like.)

At operation 316, a shipper platform 104 (e.g., the shipper device 112) may transmit a carrier entrustment message to the selected carrier platform 108. The carrier entrustment message may be utilized to indicate that the selected carrier platform has been selected to carry out the item order delivery based on the selected carrier platform's bid response.

At operation 318 the selected carrier platform 108 may also send a carrier acceptance message from the carrier platform 108 to the shipper platform 104 (e.g., the shipper device 112) in response to the receipt of the carrier entrustment message (e.g., to acknowledge receipt of the carrier entrustment message). In various embodiments, the carrier acceptance message may include further details on how the item is to be delivered to the courier, such as a license plate number or other details of a specific courier that were omitted in the bid response for brevity. For example, the bid response may include bid response information that may be utilized by the shipper platform to make a selection of a carrier platform. However, there may be more details that would not be necessary for carrier selection but may be useful for the shipper platform to coordinate the final delivery. In certain embodiments, the carrier platform may include a carrier device that coordinates among respective couriers of the carrier platform. Accordingly, the carrier platform may only assign a courier to a particular item order only once the carrier entrustment message is received. Thus, the specific information (e.g., carrier delivery details) concerning the assigned courier may then be sent over in the carrier acceptance message.

At operation 320, carrier delivery details may be provided to the customer device 102 from the shipper platform 104 (e.g., the shipper device 112). The carrier delivery details may characterize how the final delivery is to be made. For example, the carrier delivery details may include details such as a pickup time, a quality of service, an estimated time of arrive, a carrier personnel identifier (e.g., the name of the driver), a license plate number or other details of a specific courier that will be performing the final delivery. In particular embodiments, the carrier delivery details provided to the customer device 102 may include, for example, a status (e.g., assigned, enroute to pick up, enroute to customer, delivered), driver details (e.g., name, photo of the driver), vehicle details (license plate number, color, make, model), estimated time of arrival, and whether the item order may be rejected or cancelled. These carrier delivery details may be provided by the carrier platform in, for example, operation 318, and/or operation 312, discussed further above. In certain embodiments, the carrier delivery details may not be exactly the same information provided by the carrier platform 108 to the shipper platform 104. For example, the shipper platform 104 may provide selective delivery details to the customer device 102 that may not include all of the information received from the carrier platform 108. For example, the information received from the carrier platform 108 may include a price, and anticipated pick up time at the distribution center but the selective delivery details may only include the estimated time of arrival of the courier to the customer location or an indication that the item order is ready for final delivery.

At operation 322 the carrier platform 108 may send a carrier pickup notification that characterizes a live estimated time of arrival for a courier to pick up the item from a distribution center. This live estimated time of arrival may be based on information on a current location and heading of a courier. Also, this live estimated time of arrival may be determined by the carrier platform and provided to the shipper platform 104 or may be determined by the shipper platform 104 based on information received from the carrier platform 108, such as a current location and the known location of the distribution center.

At operation 324, the shipper platform may produce a carrier loading instruction to ready the item for pick up by the courier at the distribution center based on (e.g., by or around) the estimated time of arrival. This carrier loading instruction may, for example, instruct personnel at the distribution center (e.g., pickup location) to prepare the items of the item order for pick up by the courier of the carrier platform. For example, the carrier loading instruction may instruct personnel at the distribution center to assemble and bring out the item order curbside to the courier. In certain embodiments, the carrier loading instruction may instruct the distribution center to move the item order from a warehouse to a storefront of the distribution center. The warehouse may be a back office storage location where items are stored or organized for long term storage. The warehouse may be where items are stored upon delivery to the distribution center. The storefront may be a front office where items may be temporarily stored for quick retrieval. The manner of item storage at the warehouse may be different than at the storefront, such as where item storage at the warehouse may be indexed based on the type of item while item storage at the storefront may be based on item order, where multiple item orders may be assembled from items at the warehouse and brought to the storefront for storage. In various embodiments, movement of the item order at the distribution center may be performed in a manual manner (e.g., as moved by distribution center personnel). In particular embodiments, movement of the item order at the distribution center may be made via automated equipment (e.g., via a system of robotic arms, automated guided vehicles, and/or conveyor belts).

In certain embodiments, a single courier and/or carrier platform may (e.g., for efficiency's sake) deliver multiple item orders. Thus, the single courier may also load up multiple item orders at the distribution center or pickup location for delivery in series of each respective item order to each customer location.

At operation 326, the shipper platform (e.g., the shipper device 112) may, optionally, send an item order loading completion notice to the carrier platform. This item order loading completion notice may inform the carrier platform that the courier is fully loaded with the item order and may leave for the customer location (e.g., perform or complete final delivery).

At operation 328, optionally, delivery status information may be requested from the carrier platform. For example, this delivery status information may be requested as part of pull, which refers to the shipper platform requesting the delivery status information from the carrier platform. When provided as a pull, the shipper platform 104 may send a delivery status request to the carrier platform and the carrier platform may respond with the delivery status information (as will be discussed further below in operation 330). When provided as a pull, also, the shipper platform may periodically send the delivery status request to the carrier platform. In certain embodiments, operation 328 is omitted, such as in embodiments in which delivery status information is provided as a push from the carrier platform 108.

At operation 330, delivery status information may be provided to the shipper platform (e.g., the shipper device) by the carrier platform 108. This delivery status information may characterize the status of the delivery being performed by the courier. For example, the delivery status information may include a courier location and/or an estimated time of arrival to a customer location. In various embodiments, this delivery status information may be provided as a push or as a pull. When provided as a push, the carrier platform may periodically provide the delivery status information to the shipper platform. As noted above, when provided as a pull, the shipper platform 104 may send a delivery status request to the carrier platform and the carrier platform may respond with the delivery status information.

In operation 322, the delivery status information may be sent from the shipper platform 104 (e.g., the shipper device 112) to the customer device 102. In certain embodiments, the shipper platform may provide the same delivery status information received from the carrier platform 108 to the customer device 102 (e.g., via an electronic portal or a push notification to the customer device). In further embodiments, the shipper platform 104 may provide selective delivery status information to the customer device 102 that may not include all of the delivery status information received from the carrier platform. For example, the delivery status information may include a current location and speed of the courier but the selective delivery status information may only include the estimated time of arrival of the courier to the customer location. In various embodiments, the delivery status information and/or the selective delivery status information may be provided to the customer device 102 as a tracking uniform resource locator (URL) or as data for an application hosted by the customer device 102.

In particular embodiments, the delivery status information and/or selective delivery status information provided to the customer device 102 may include, for example, a status (e.g., assigned, enroute to pick up, enroute to customer, delivered), driver details (e.g., name, photo of the driver), vehicle details (license plate number, color, make, model), estimated time of arrival, and whether the item order may be rejected (e.g., cancelled). These carrier delivery details may be provided by the carrier platform in, for example, operation 328, operation 318, and/or operation 312, discussed further above.

Although the process 300 may describe only a single instance of operations 328, 330, and 332, any number of instances of operations 328, 330 and/or 332 may be performed by the process 300 in different applications in accordance with various embodiments. For example, pull based access to delivery status information may mean that operations 328, 330 and/or 332 are repeated regularly at certain intervals of time (e.g., once every second, once every minute, once every hour, etc.). As another example, push based access to delivery status information may mean that operation 328 is omitted and operations 330 and 332 are repeated regularly at certain intervals of time (e.g., once every second, once every minute, once every hour, etc.).

At operation 334, a fulfillment notification may be sent from the carrier platform 108 to the shipper platform 104 (e.g., the shipper device 112). The fulfillment notification may indicate that the item order has been delivered to the customer location and that final delivery performed by the carrier platform is complete. In certain embodiments, the fulfillment notification may include a characterization of how the item order was completed, such as a time of completion and/or rating for the delivery produced by either the carrier platform, shipper platform, and/or customer device.

At operation 338, the shipper device 112 may update the records at the fulfillment server 116. For example, the records may be updated to note that the item order has been fulfilled (e.g., that the item order has been delivered to the customer location). In certain embodiments, the records at the fulfillment server 116 may be utilized to produce reports. These reports may include, for example, driver performance reports of particular couriers (e.g., working hours, distance driven, punctuality), queries on specific drivers or couriers (e.g., total shifts, orders, rated orders, average rating, etc.), performance actuals versus estimated time of arrival, average late times, and the like.

Figure 3B:
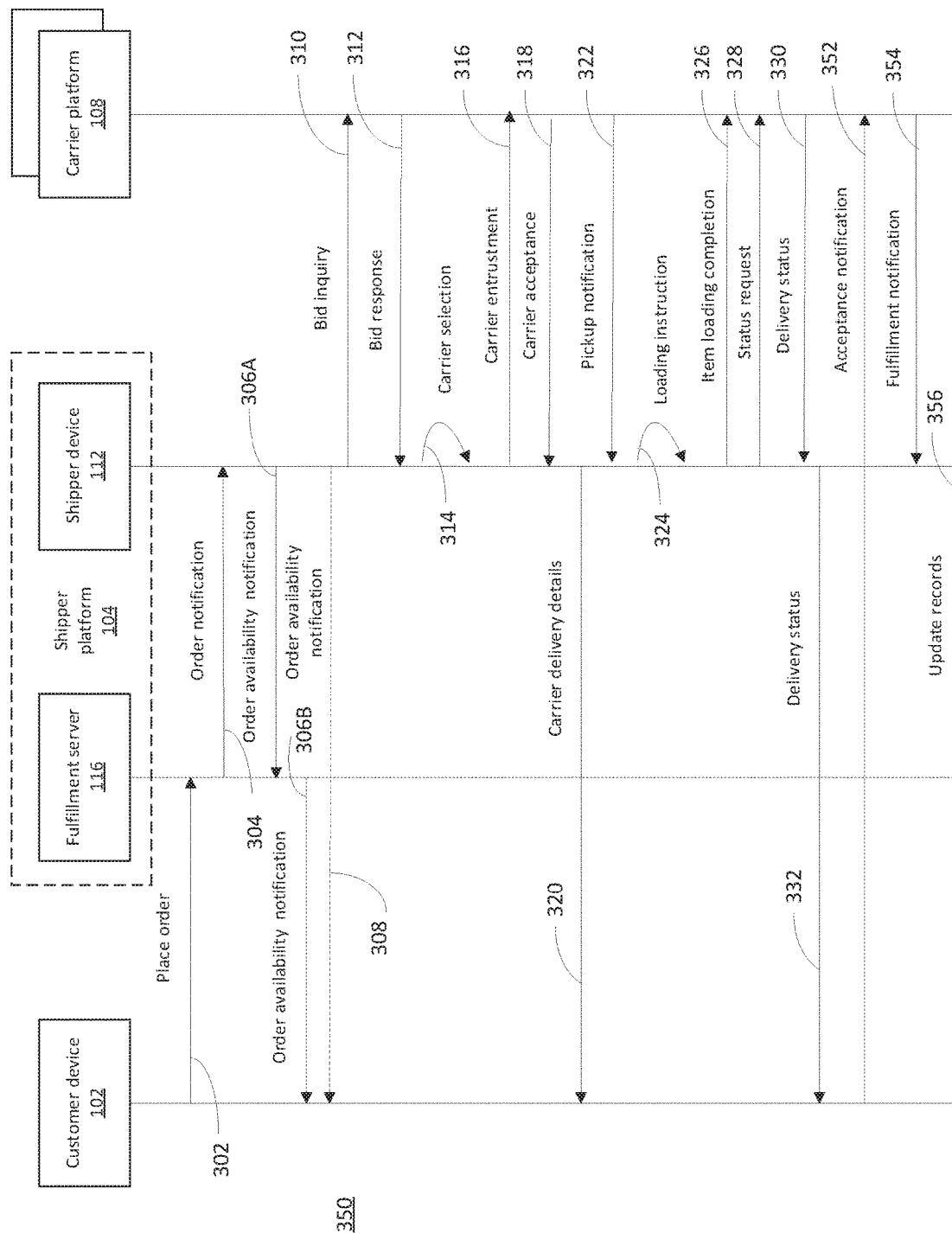
FIG. 3B is a diagram that illustrates a final delivery management process with a customer device acceptance notification sent to the carrier platform directly, in accordance with some embodiments.

FIG. 3B is a diagram that illustrates a final delivery management process 350 with a customer device acceptance notification sent to the carrier platform directly, in accordance with some embodiments. The process 350 may be performed by the customer device 102, the shipper platform 104 and at least one carrier platform 108, interconnected over a network such as the Internet. As noted above, the shipper platform 104 may include a shipper device 112 and a fulfilment server 116. It is noted that the process 350 is merely an example, and is not intended to limit the present disclosure. Accordingly, it is understood that additional operations may be provided before, during, and after the process 350 of FIG. 3B, certain operations may be omitted, certain operations may be performed concurrently with other operations, and that some other operations may only be briefly described herein. Operations 302-332 are similar to that already discussed above and will not be repeated below for brevity.

At operation 352, an acceptance notification may be sent from the customer device 102 to the carrier platform 108 once the courier has delivered the item order to the carrier location. This acceptance notification may notify the carrier platform that the customer has accepted the item order and that final delivery performed by the carrier platform is complete. In certain embodiments, the acceptance notification may include other information, such as a time of acceptance, a rating or other characterization of the customer's experience with the delivery.

At operation 354, a fulfillment notification may be sent from the carrier platform 108 to the shipper platform 104 (e.g., the shipper device 112). The fulfillment notification may indicate that the item order has been delivered to the customer location and that final delivery performed by the carrier platform is complete based on the acceptance notification received from the customer device in operation 352.

In certain embodiments, the fulfillment notification may include other information, such as the time of acceptance, a rating or other characterization of the customer's experience with the delivery as received by the customer device, a rating of the courier's experience with the delivery, or other information as noted by the carrier platform.

At operation 356, the shipper device 112 may update the records at the fulfillment server 116. For example, the records may be updated to note that the item order has been fulfilled (e.g., that the item order has been delivered to the customer location and accepted by the customer as indicated by the customer device 102). In certain embodiments, the records at the fulfillment server 116 may be utilized to produce reports. These reports may include, for example, driver performance reports of particular couriers (e.g., working hours, distance driven, punctuality), queries on specific drivers or couriers (e.g., total shifts, orders, rated orders, average rating, etc.), performance actuals versus estimated time of arrival, average late times, and the like.

Figure 3C:
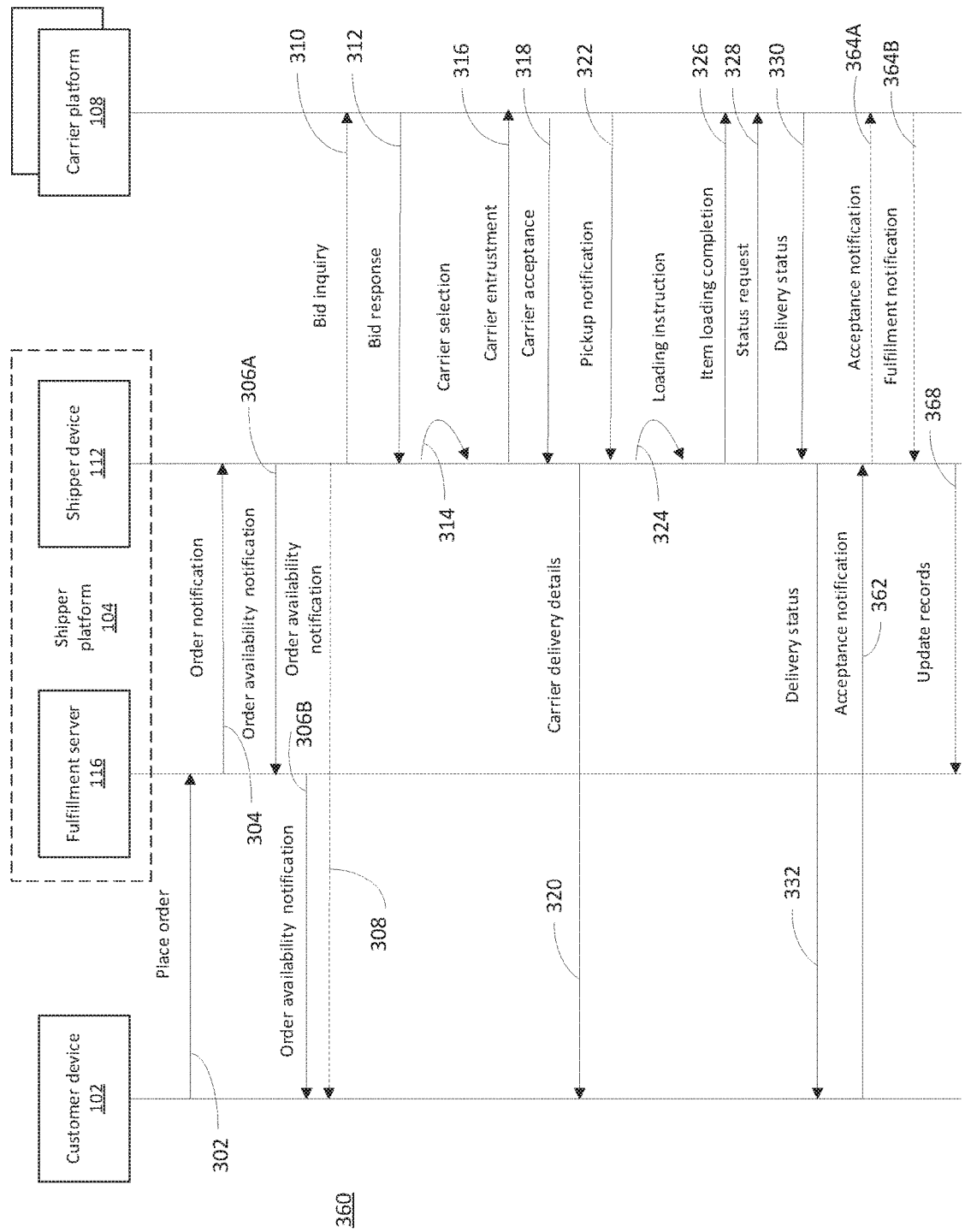
FIG. 3C is a diagram that illustrates final delivery management process with a customer device acceptance notification sent to the shipper platform directly, in accordance with some embodiments.

FIG. 3C is a diagram that illustrates final delivery management process 360 with a customer device acceptance notification sent to the shipper platform directly, in accordance with some embodiments. The process 360 may be performed by the customer device 102, the shipper platform 104 and at least one carrier platform 108, interconnected over a network such as the Internet. As noted above, the shipper platform 104 may include a shipper device 112 and a fulfilment server 116. It is noted that the process 360 is merely an example, and is not intended to limit the present disclosure. Accordingly, it is understood that additional operations may be provided before, during, and after the process 360 of FIG. 3C, certain operations may be omitted, certain operations may be performed concurrently with other operations, and that some other operations may only be briefly described herein. Operations 302-332 are similar to that already discussed above and will not be repeated below for brevity.

At operation 362, an acceptance notification may be sent from the customer device 102 to the shipper platform 104 once the courier has delivered the item order to the carrier location. This acceptance notification may notify the shipper platform that the customer has accepted the item order and that final delivery performed by the carrier platform is complete.

In certain embodiments, the acceptance notification may include other information, such as a time of acceptance, a rating or other characterization of the customer's experience with the delivery.

Optionally as noted with dotted lines, at operation 364A, the shipper platform 104 (e.g., the shipper device 112) may send (e.g., pass) the acceptance notification to the carrier platform 108. This acceptance notification may notify the carrier platform that the customer has accepted the item order and that final delivery performed by the carrier platform is complete. Further, optionally as noted with dotted lines, at operation 364B, a fulfillment notification may be sent from the carrier platform 108 to the shipper platform 104 (e.g., the shipper device 112). The fulfillment notification may simply acknowledge that the carrier platform has completed the item order based on the received acceptance notification. In certain embodiments, the fulfillment notification may include other information, such as a rating of the courier's experience with the delivery, or other information as noted by the carrier platform.

At operation 368, the shipper device 112 may update the records at the fulfillment server 116. For example, the records may be updated to note that the item order has been fulfilled (e.g., that the item order has been delivered to the customer location and accepted by the customer as indicated by the customer device 102). In certain embodiments, the records at the fulfillment server 116 may be utilized to produce reports. These reports may include, for example, driver performance reports of particular couriers (e.g., working hours, distance driven, punctuality), queries on specific drivers or couriers (e.g., total shifts, orders, rated orders, average rating, etc.), performance actuals versus estimated time of arrival, average late times, and the like.

Figure 3D:
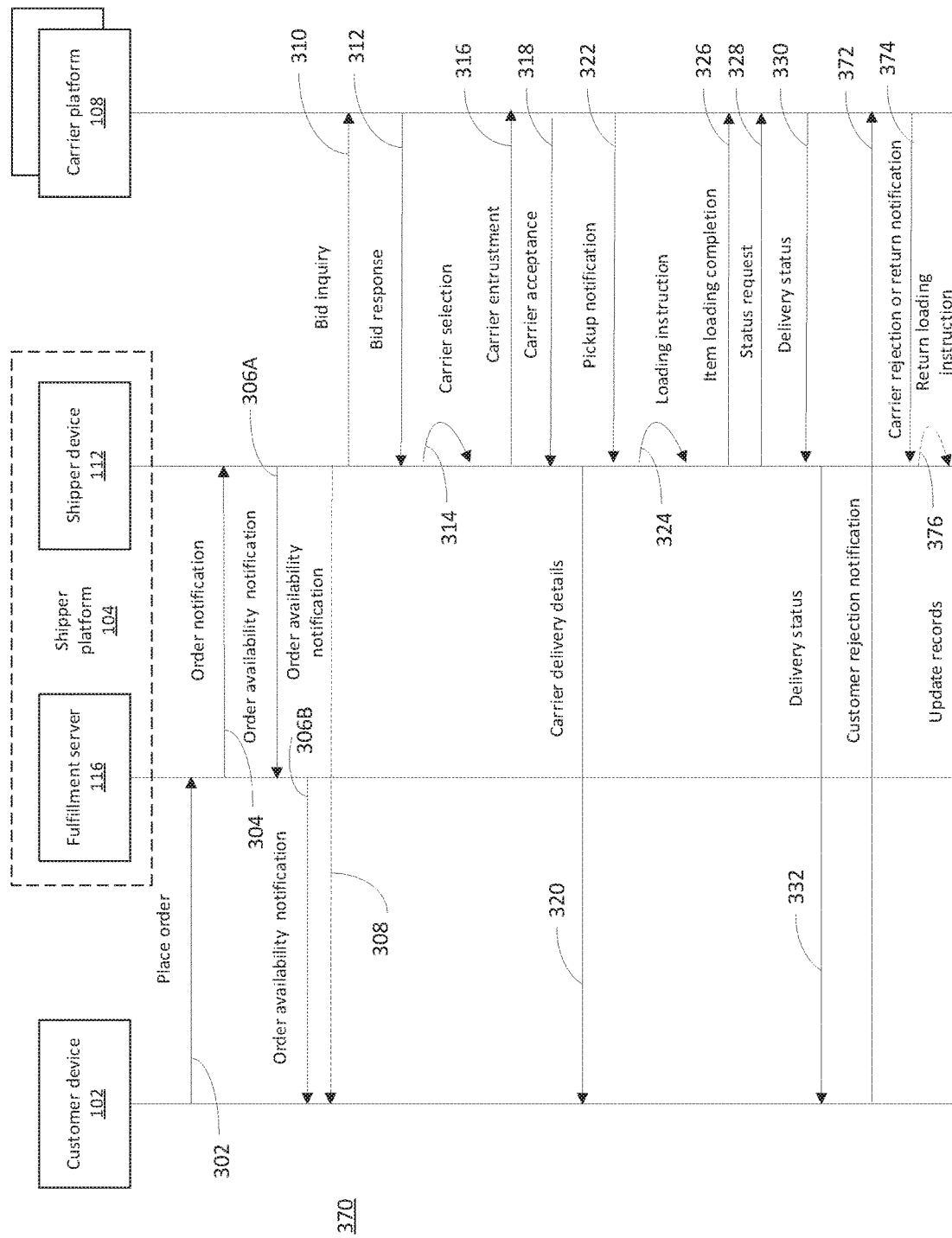
FIG. 3D is a diagram that illustrates final delivery management process with a customer device rejection notification sent to the carrier platform directly, in accordance with some embodiments.

FIG. 3D is a diagram that illustrates final delivery management process 370 with a customer device rejection notification sent to the carrier platform directly, in accordance with some embodiments. The process 370 may be performed by the customer device 102, the shipper platform 104 and at least one carrier platform 108, interconnected over a network such as the Internet. As noted above, the shipper platform 104 may include a shipper device 112 and a fulfilment server 116. It is noted that the process 370 is merely an example, and is not intended to limit the present disclosure. Accordingly, it is understood that additional operations may be provided before, during, and after the process 370 of FIG. 3D, certain operations may be omitted, certain operations may be performed concurrently with other operations, and that some other operations may only be briefly described herein. Operations 302-332 are similar to that already discussed above and will not be repeated below for brevity.

At operation 372, a rejection notification may be sent from the customer device 102 to the carrier platform 108 once the courier has delivered the item order to the carrier location. This rejection notification may notify the carrier platform that the customer has rejected the item order and that final delivery performed by the carrier platform cannot be completed as planned. In certain embodiments, this rejection notification may be referred to as a cancellation of the item order. In further embodiments, the rejection notification may include other information, such as a time of rejection, a rating or other characterization of the customer's experience with the delivery.

This rejection may be made based on any of a variety of criteria. For example, item order rejection may be based on, for example, receipt of the item order in a damaged state or tardiness of final delivery (e.g., where the courier took too long to deliver an item order, such as an item order of perishable items such as hot or cold food).

At operation 374, the carrier platform 108 may send a carrier rejection or return notification to the shipper platform (e.g., the shipper device 112). The rejection notification may indicate that there has been a rejection without any indication of return of the items in the item order. For example, certain items in the item order may be perishable (e.g., food) such that return of the perishable items is not feasible and/or desired by the shipper. In certain embodiments, the carrier rejection or return notification may include other information, such as the time of rejection, a rating or other characterization of the customer's experience with the delivery as received by the customer device, a rating of the courier's experience with the delivery, or other information as noted by the carrier platform.

In certain embodiments, whether there is a return along with the rejection may be predetermined, such as indicated to the carrier platform by the customer device and/or the shipper platform as part of a bid inquiry (e.g., operation 310), carrier entrustment (e.g., operation 316), item loading completion (e.g., operation 326), status request (e.g., operation 328), or in another communication to the carrier platform 108 to indicate that a particular item order is to be returned if rejected. When there is a return, the carrier rejection or return notification may indicate that there has been a rejection and how the items in the item order will be returned to the shipper (e.g., to the distribution center from which the item order was picked up). Accordingly, in certain embodiments, a return of the item order may during final delivery may also fall under a rejection of the item order. This return notification information may include, for example, a location or estimated time of arrival of the courier during the return to the distribution center for return of the items. In certain embodiments, the carrier rejection or return notification may include other information, such as the time of rejection, a rating or other characterization of the customer's experience with the delivery as received by the customer device, a rating of the courier's experience with the delivery, or other information as noted by the carrier platform.

Optionally, as noted with dotted lines, at operation 376, the shipper platform may produce a return loading instruction to ready the returned item order for pick up from the courier at the distribution center based on (e.g., by or around) the estimated time of arrival when the return of the item order is to take place (e.g., based on a carrier return notification). This return loading instruction may, for example, instruct personnel at the distribution center or pickup location to be ready to pick up the item and/or to restock the item at the distribution center. In various embodiments, movement of the item order at the distribution center may be performed in a manual manner (e.g., as moved by distribution center personnel). In particular embodiments, movement of the item order at the distribution center may be made via automated equipment (e.g., via a system of robotic arms, automated guided vehicles, and/or conveyor belts).

At operation 378, the shipper device 112 may update the records at the fulfillment server 116. For example, the records may be updated to note that the item order has not been fulfilled (e.g., that the item order has not been delivered to the customer location and accepted by the customer as indicated by the customer device 102). In certain embodiments, the records may be associated with the particular carrier platform as to the fact that an item order rejection and/or return has taken place and/or with the particular courier involved. In certain embodiments, the records at the fulfillment server 116 may be utilized to produce reports. These reports may include, for example, driver performance reports of particular couriers (e.g., working hours, distance driven, punctuality), queries on specific drivers or couriers (e.g., total shifts, orders, rated orders, average rating, etc.), performance actuals versus estimated time of arrival, average late times, and the like.

Figure 3E:
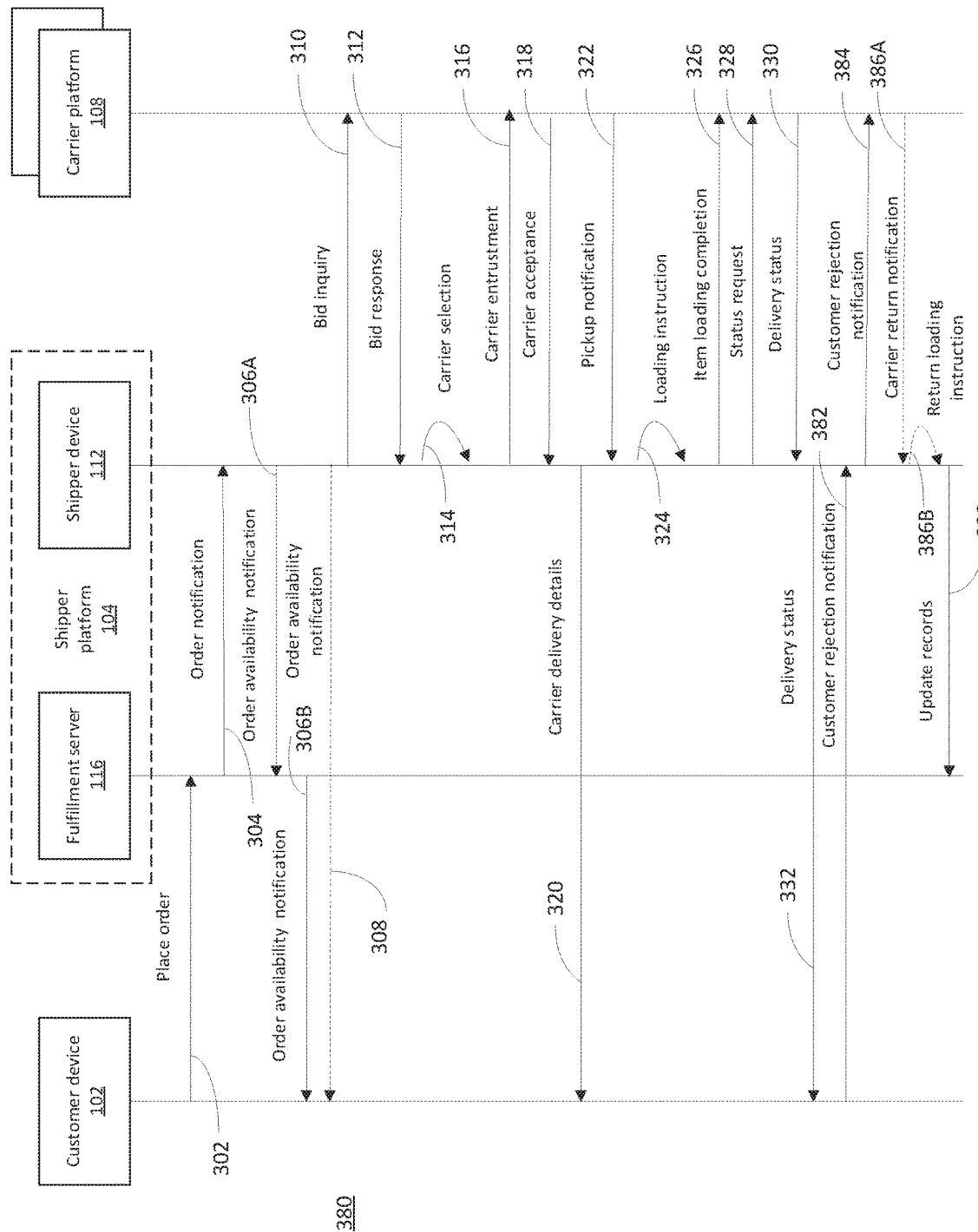
FIG. 3E is a diagram that illustrates final delivery management process with a customer device rejection notification sent to the shipper platform directly, in accordance with some embodiments.

FIG. 3E is a diagram that illustrates final delivery management process 380 with a customer device rejection notification sent to the shipper platform directly, in accordance with some embodiments. The process 380 may be performed by the customer device 102, the shipper platform 104 and at least one carrier platform 108, interconnected over a network such as the Internet. As noted above, the shipper platform 104 may include a shipper device 112 and a fulfillment server 114. It is noted that the process 380 is merely an example, and is not intended to limit the present disclosure. Accordingly, it is understood that additional operations may be provided before, during, and after the process 380 of FIG. 3E, certain operations may be omitted, certain operations may be performed concurrently with other operations, and that some other operations may only be briefly described herein. Operations 302-332 are similar to that already discussed above and will not be repeated below for brevity.

At operation 382, a rejection notification may be sent from the customer device 102 to the shipper platform 104 (e.g., the shipper device 112) once the courier has delivered the item order to the carrier location. This rejection notification may notify the shipper platform 104 that the customer has rejected the item order and that final delivery performed by the carrier platform cannot be completed as planned. In certain embodiments, the rejection notification may include other information, such as a time of rejection, a rating or other characterization of the customer's experience with the delivery.

This rejection may be made based on any of a variety of criteria. For example, item order rejection may be based on, for example, receipt of the item order in a damaged state or tardiness of final delivery (e.g., where the courier took too long to deliver an item order, such as an item order of perishable items such as hot or cold food).

At operation 384, a rejection notification may be sent from the shipper platform 104 (e.g., the shipper device 112) to the carrier platform 108 based on the rejection notification of operation 384. In certain embodiments, the shipper platform 104 may pass along the rejection notification received in operation 382 to the carrier platform 108. This rejection notification may notify the carrier platform 108 that the customer has rejected the item order and that final delivery performed by the carrier platform cannot be completed as planned.

At operation 386A, optionally, the carrier platform 108 may send a carrier return notification to the shipper platform (e.g., the shipper device 112). The return notification may indicate how the items in the item order will be returned to the shipper (e.g., to the distribution center from which the item order was picked up). This return notification information may include, for example, a location or estimated time of arrival of the courier during the return to the distribution center for return of the items. In certain embodiments, the carrier return notification may include other information, such as a rating of the courier's experience with the delivery, or other information as noted by the carrier platform.

Optionally, as noted with dotted lines, at operation 386B, the shipper platform may produce a return loading instruction to ready the returned item order for pick up from the courier at the distribution center based on (e.g., by or around) the estimated time of arrival when the return of the item order is to take place (e.g., based on a carrier return notification). This return loading instruction may, for example, instruct personnel at the distribution center or pickup location to be ready to pick up the item and/or to restock the item at the distribution center. In various embodiments, movement of the item order at the distribution center may be performed in a manual manner (e.g., as moved by distribution center personnel). In particular embodiments, movement of the item order at the distribution center may be made via automated equipment (e.g., via a system of robotic arms, automated guided vehicles, and/or conveyor belts).

At operation 388, the shipper device 112 may update the records at the fulfillment server 116. For example, the records may be updated to note that the item order has been not been fulfilled (e.g., that the item order has not been delivered to the customer location and accepted by the customer as indicated by the customer device 102). In certain embodiments, the records may be associated with the particular carrier platform as to the fact that an item order rejection and/or return has taken place and/or with the particular courier involved. In certain embodiments, the records at the fulfillment server 116 may be utilized to produce reports. These reports may include, for example, driver performance reports of particular couriers (e.g., working hours, distance driven, punctuality), queries on specific drivers or couriers (e.g., total shifts, orders, rated orders, average rating, etc.), performance actuals versus estimated time of arrival, average late times, and the like.

Figure 4:
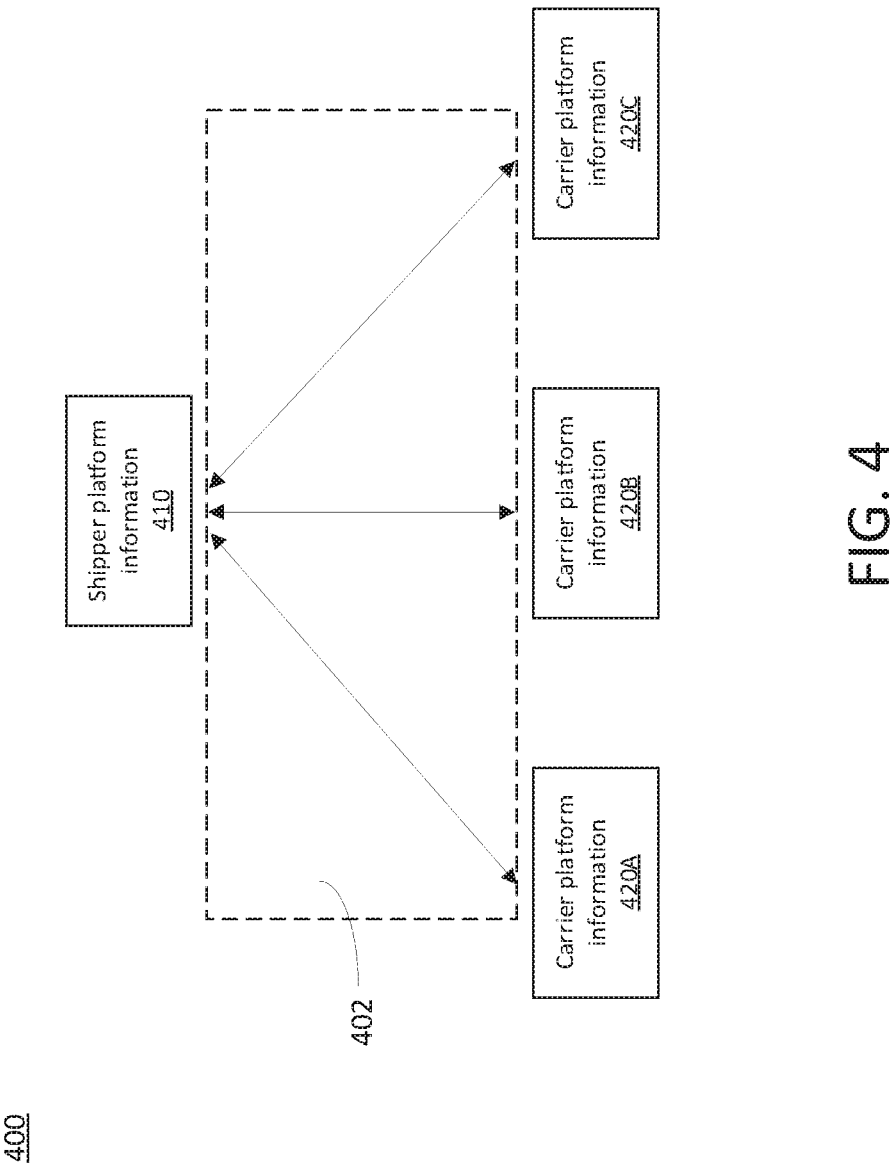
FIG. 4 is a block diagram that illustrates a carrier platform interface, in accordance with certain embodiments.

FIG. 4 is a block diagram 400 that illustrates a carrier platform interface 402, in accordance with certain embodiments. As noted above, a shipper platform may produce and process shipper platform information 410 that may be different, at least in format, than carrier platform information 420A, 420B, 420C associated with different carrier platforms. Also, each carrier platform may be associated with different interaction requirements. For example, a first carrier platform associated with carrier platform information 420A may utilize a particular application programming interface (API) for communication and configured to receive a shipper platform information 410 (e.g., a bid inquiry) formatted in a particular data structure or format. Similarly, a second carrier platform associated with carrier platform information 420B may utilize a different API for communication and configured to receive the same shipper platform information 410 (e.g., the bid inquiry) formatted in a different data structure or format as compared with the first carrier platform.

Accordingly, the carrier platform interface 402 may facilitate communications between the single shipper platform and the different carrier platforms by translating and converting between the shipper platform information 410 and respective carrier platform information 420A, 420B, 420C. For example, the carrier platform interface 402 may send shipper platform information meant for a particular carrier platform via an API of that particular carrier platform so that the transmitted shipper platform information may be properly received and processed by that particular carrier platform. Similarly, the carrier platform interface may receive carrier platform information for transmission to the shipper platform via the same API of that particular carrier platform so that the transmitted carrier platform information may be properly received and processed by the shipper platform. This API may be different for each carrier platform. In addition, the carrier platform interface may also process received and/or transmitted information, such as via filling in or formatting the information to respective parameter fields of a respective data structure of a carrier platform or shipper platform. Although a certain set number of carrier platforms may be referenced above in connection to the carrier platform interface 402, the carrier platform interface 402 may facilitate interactions between a shipper platform (e.g., the shipper platform information 410 of the shipper platform) and any number of carrier platforms (e.g., the associated carrier platform information 420A, 420B, 420C) as desired for different applications in various embodiments. For example, the carrier platform interface 402 may facilitate interactions between a shipper platform and less than or greater than three carrier platforms.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system, comprising:
a processor operatively coupled with a datastore via a network; and
a non-transitory memory storing instructions that, when executed, cause the processor to:
generate a bid inquiry that characterizes an item for delivery, the bid inquiry being generated having a first data format that is associated with a shipper platform, wherein the bid inquiry includes information about: a distribution center location, a pick up time, an item weight, and an item quantity;
convert, by a carrier platform interface associated with a plurality of carrier devices, the bid inquiry from the first data format into a second data format that is different from the first data format, the second data format being processable by a first interface that is associated with a first carrier device of the plurality of carrier devices;
convert, by the carrier platform interface, the bid inquiry from the first data format into a third data format that is different from the first data format and the second data format, said third data format being processable by a second interface that is associated with a second carrier device of the plurality of carrier devices, wherein the first data format is in a first data structure common to the shipper platform, the second data format is in a second data structure common to the first interface, and the third data format is in a third data structure common to the second interface;
transmit, via the network, using the first interface, the bid inquiry to the first carrier device in the second data format;
transmit, via the network using the second interface, the bid inquiry to the second carrier device in the third data format;
receive, via the network, first bid information responsive to the bid inquiry from the first carrier device in the second data format;
receive, via the network, second bid information responsive to the bid inquiry from the second carrier device in the third data format;
convert, by the carrier platform interface, at least a portion of the first bid information and at least a portion of the second bid information into the first data format;
determine a common delivery condition set of the converted first bid information and the converted second bid information, the common delivery condition set including common categorical data present in both the first bid information and the second bid information;
compare the common delivery condition set of the converted first bid information and the converted second bid information to generate a comparison;

select the first carrier device from the plurality of carrier devices based on the comparison;

in response to the selection of the first carrier device, transmit, via the network, a carrier entrustment message to the first carrier device using an interface of the first carrier device, the carrier entrustment message being in the second data format associated with the first carrier device and indicating acceptance of bid information associated with the first carrier device;

receive a carrier pickup notification, the carrier pickup notification being in the second data format associated with the first carrier device, from the first carrier device including a first estimated time of arrival;

receive a current location and a heading of a courier of the carrier platform;

generate a second estimated time of arrival of the courier based on the current location and heading of the courier;

transmit the second estimated time of arrival to a user device associated with the item for delivery;

generate carrier loading instructions, in response to receiving the carrier pickup notification, by a server of the shipper platform; and in response to generation of the carrier loading instructions, activate automated equipment within the distribution center to prepare an item order including the item for pickup by a courier of the carrier platform, wherein preparing the order including the item for pickup includes movement of the item from a first portion of the distribution center, wherein the item is indexed individually to a storefront of the distribution center, and wherein, upon activation, the automated equipment moves the item from the first portion of the distribution center to the storefront in accordance with the carrier loading instructions.

2. The system of claim 1, wherein the first interface is an application programming interface specific to the first carrier device.

3. The system of claim 1, wherein the common delivery condition set comprises all of the first bid information and the second bid information.

4. The system of claim 1, wherein the common delivery condition set comprises all of the first bid information but not all of the second bid information.

5. The system of claim 1, wherein the common delivery condition set comprises at least two of: a price, a pickup time, a quality of service, and a carrier personnel identifier.

6. The system of claim 1, wherein, prior to transmitting the bid inquiry to the first carrier device or the second carrier device, the instructions cause the processor to:

generate a first modified bid inquiry by formatting at least a portion of the bid inquiry for a respective parameter field of a first data structure associated with the first carrier device, wherein the bid inquiry transmitted to the first carrier device is the first modified bid inquiry; and generate a second modified bid inquiry by formatting at least a portion of the bid inquiry for a respective parameter field of a second data structure associated with the second carrier device, wherein the bid inquiry transmitted to the second carrier device is the second modified bid inquiry, and wherein the first data structure and the second data structure are different.

7. The system of claim 1, wherein the instructions cause the processor to:

in response to the item order being provided to the courier, transmitting a loading completion notice to the first carrier device;

in response to transmitting the loading completion notice, receiving, at a predetermined interval, delivery status information from the first carrier device, wherein the delivery status information includes an updated estimated time of arrival for the courier; and in response to receiving the delivery status information, transmitting the updated estimated time of arrival to the user device associated with the item for delivery.

8. A method, comprising:

generating, by a computer system comprising at least one processor executing computer-readable instructions, a bid inquiry that characterizes an item for delivery, the bid inquiry being generated having a first data format that is associated with a shipper platform, wherein the bid inquiry includes information about: a distribution center location, a pick up time, an item weight, and an item quantity;

converting, by a carrier platform interface associated with a plurality of carrier devices embodied in the computer system, the bid inquiry from the first data format into a second data format that is different from the first data format, said first data format being processable by a first interface that is associated with a first carrier device of the plurality of carrier devices;

converting, by the carrier platform interface, the bid inquiry from the first data format into a third data format that is different from the first data format and the second data format, said third data format being processable by a second interface that is associated with a second carrier device of the plurality of carrier devices, wherein the first data format is in a first data structure common to the shipper platform, the second data format is in a second data structure common to the first interface, and the third data format is in a third data structure common to the second interface;

transmitting, via a network using the first interface, the bid inquiry to the first carrier device in the second data format;

transmitting, via the network using the second interface, the bid inquiry to the second carrier device in the third data format;

receiving, via the network, first bid information responsive to the bid inquiry from the first carrier device in the second data format;

receiving, via the network, second bid information responsive to the bid inquiry from the second carrier device in the third data format;

converting, by the carrier platform interface, at least a portion of the first bid information and at least a portion of the second bid information into the first data format;

determining a common delivery condition set of the converted first bid information and the converted second bid information, the common delivery condition set including common categorical data present in both the first bid information and the second bid information;

comparing the common delivery condition set of the converted first bid information and the converted second bid information to generate a comparison;

selecting the first carrier device from the plurality of carrier devices based on the comparison;

in response to the selection of the first carrier device, transmitting, via the network, a carrier entrustment message to the first carrier device using an interface of the first carrier device, the carrier entrustment message being in the second data format associated with the first carrier device and indicating acceptance of bid information associated with the first carrier device;

receiving a carrier pickup notification, the carrier pickup notification being in the second data format associated with the first carrier device, from the first carrier device including a first estimated time of arrival;

receiving a current location and a heading of a courier of the carrier platform;

generating a second estimated time of arrival of the courier based on the current location and heading of the courier;

transmitting the second estimated time of arrival to a user device associated with the item for delivery;

generating carrier loading instructions, in response to receiving the carrier pickup notification, by a server of the shipper platform; and in response to generation of the carrier loading instruction, activating automated equipment within the distribution center to prepare an item order including the item for pickup by a courier of the carrier platform, wherein preparing the order including the item for pickup includes movement of the item from a first portion of the distribution center, wherein the item is indexed individually to a storefront of the distribution center, and wherein, upon activation, the automated equipment moves the item from the first portion of the distribution center to the storefront in accordance with the carrier loading instructions.

9. The method of claim 8, wherein the carrier entrustment message further indicates that the first carrier device is to deliver the item; and the method further comprising:

receiving a carrier acceptance message from the first carrier device, wherein the carrier acceptance message comprises details on how the item is to be delivered by a courier that is different than the first bid information.

10. The method of claim 9, further comprising:
sending the details on how the item is to be delivered by the courier to a customer device.

11. The method of claim 8, further comprising:
receiving a carrier pickup notification from the first carrier device, wherein the carrier pickup notification characterizes an estimated time of arrival for a courier to pick up the item from a distribution center; and
creating a carrier loading instruction to ready the item for pick up by the courier at the distribution center by the estimated time of arrival.

12. The method of claim 11, wherein the courier is integrated with the first carrier device.

13. The method of claim 8, further comprising:
sending a request for delivery status information to the first carrier device, wherein the delivery status information comprises a courier location and an estimated time of arrival to a customer location;
receiving the delivery status information from the first carrier device in response to the request for the delivery status information; and
receiving an acceptance notification from a customer device of a customer, wherein the acceptance notification indicates that the customer has accepted an order for the item and that final delivery performed by the carrier platform is complete.

14. A non-transitory computer readable medium having instructions stored thereon, wherein the instructions, when executed by a processor, cause a device to perform operations comprising:

generating a bid inquiry that characterizes an item for delivery, the bid inquiry being generated having a first data format that is associated with a shipper platform, wherein the bid inquiry includes information about: a distribution center location, a pick up time, an item weight, and an item quantity;

converting, by a carrier platform interface having a plurality of carrier devices, the bid inquiry from the first data format into a second data format that is different from the first data format, said first data format being processable by a first interface that is associated with a first carrier device of the plurality of carrier devices;

converting, by the carrier platform interface, the bid inquiry from the first data format into a third data format that is different from the first data format and the second data format, said third data format being processable by a second interface that is associated with a second carrier device of the plurality of carrier devices, wherein the first data format is in a first data structure common to the shipper platform, the second data format is in a second data structure common to the first interface, and the third data format is in a third data structure common to the second interface;

transmitting, via a network using the first interface, the bid inquiry to the first carrier device in the second data format;

transmitting, via the network using the second interface, the bid inquiry to the second carrier device in the third data format;

receiving, via the network, first bid information responsive to the bid inquiry from the first carrier device in the second data format;

receiving, via the network, second bid information responsive to the bid inquiry from the second carrier device in the third data format;

converting, by the carrier platform interface, at least a portion of the first bid information and at least a portion of the second bid information into the first data format;

determining a common delivery condition set of the converted first bid information and the converted second bid information, the common delivery condition set including common categorical data present in both the first bid information and the second bid information;

comparing the common delivery condition set of the converted first bid information and the converted second bid information to generate a comparison;

selecting the first carrier device from the plurality of carrier devices based on the comparison;

in response to the selection of the first carrier device, transmitting, via the network, a carrier entrustment message to the first carrier device using an interface of the first carrier device, the carrier entrustment message being in the second data format associated with the first carrier device and indicating acceptance of bid information associated with the first carrier device;

receiving a carrier pickup notification, the carrier pickup notification being in the second data format associated with the first carrier device, from the first carrier device including a first estimated time of arrival;

receiving a current location and a heading of a courier of the carrier platform;

generating an estimated time of arrival of the courier based on the current location and heading of the courier;

transmitting the estimated time of arrival to a user device associated with the item for delivery;

generating carrier loading instructions, in response to receiving the carrier pickup notification, by a server of the shipper platform; and in response to generation of the carrier loading instruction, activating automated equipment within the distribution center to prepare an item order including the item for pickup by a courier of the carrier platform, wherein preparing the items order including the item for pickup includes movement of the item from a first portion of the distribution center, wherein the item is indexed individually to a storefront of the distribution center, and wherein, upon activation, the automated equipment moves the item from the first portion of the distribution center to the storefront in accordance with the carrier loading instructions.

15. The non-transitory computer readable medium of claim 14, wherein the operations further comprise:

receiving delivery status information from the first carrier device, wherein the delivery status information characterizes a courier's status during delivery; and sending selective delivery status information to a customer device, wherein the selective delivery status information is a paired down version of the delivery status information.

16. The non-transitory computer readable medium of claim 14, wherein the operations further comprise:

receiving a fulfillment notification from the first carrier device, wherein the fulfillment notification indicates that the item was delivered to a customer; and sending record update information to a fulfillment server, wherein the record update information notes that the item was delivered to the customer.

17. The non-transitory computer readable medium of claim 14, wherein the operations further comprise:

receiving a customer rejection notification, wherein the customer rejection notification cancels an order for the item; and sending a customer rejection instruction to the first carrier device, where the customer rejection instruction instructs the first carrier device to return the item.

18. The non-transitory computer readable medium of claim 14, wherein the operations further comprise:

receiving a carrier return notification that characterizes a courier's status during return of an item of a cancelled order.

19. The non-transitory computer readable medium of claim 14, wherein the operations further comprise:

sending record update information to a fulfillment server, wherein the record update information notes that an order was cancelled.

* * * * *